United States Patent
Saha et al.

(10) Patent No.: US 12,154,226 B2
(45) Date of Patent: Nov. 26, 2024

(54) METHODS AND SYSTEMS FOR GENERATING THREE DIMENSIONAL (3D) MODELS OF OBJECTS

(71) Applicant: SAMSUNG ELECTRONICS CO., LTD., Suwon-si (KR)

(72) Inventors: Sujoy Saha, Bengaluru (IN); Mahantesh Mallappa Ambi, Bengaluru (IN); Rajat Kumar Jain, Bengaluru (IN); Amita Badhwar, Bengaluru (IN); Aditi Singhal, Bengaluru (IN); Rakesh Abothula, Bengaluru (IN); Lokesh Rayasandra Boregowda, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 17/948,863

(22) Filed: Sep. 20, 2022

(65) Prior Publication Data
US 2023/0012372 A1   Jan. 12, 2023

Related U.S. Application Data

(63) Continuation-in-part of application No. PCT/KR2022/007301, filed on May 23, 2022.

(30) Foreign Application Priority Data

May 24, 2021  (IN) .............................. 202141023551
Apr. 11, 2022  (IN) .............................. 202141023155

(51) Int. Cl.
G06T 17/20         (2006.01)
G06N 3/04          (2023.01)
(Continued)

(52) U.S. Cl.
CPC ............. *G06T 17/20* (2013.01); *G06N 3/045* (2023.01); *G06T 7/60* (2013.01); *G06T 15/20* (2013.01); *G06T 2207/20084* (2013.01)

(58) Field of Classification Search
CPC ........... G06T 17/20; G06T 7/60; G06T 15/20; G06T 2207/20084; G06T 17/00;
(Continued)

(56) References Cited

U.S. PATENT DOCUMENTS 7,756,325 B2   7/2010   Vetter et al.
8,405,661 B2   3/2013   Amsterdam et al.
(Continued)

FOREIGN PATENT DOCUMENTS

KR   1020190112428 A   10/2019
KR   1020210023671 A    3/2021
(Continued)

OTHER PUBLICATIONS

International Search Report (PCT/ISA/210) and Written Opinion (PCT/ISA/237) dated Sep. 22, 2022 issued by the International Searching Authority in International Application No. PCT/KR2022/007301.
(Continued)

*Primary Examiner* — Vijay Shankar
(74) *Attorney, Agent, or Firm* — Sughrue Mion, PLLC

(57) ABSTRACT

A method for generating a three-dimensional (3D) model of an object includes receiving a two-dimensional (2D) view of at least one object as an input, measuring geometrical shape coordinates of the at least one object from the input, identifying texture parameters of the at least one object from the input, predicting geometrical shape coordinates and texture parameters of occluded portions of the at least one object in the 2D view by processing the measured geometrical shape coordinates of the at least one object, the identified texture
(Continued)

parameters of the at least one object, and the occluded portions of the at least one object, and generating a 3D model of the at least one object by mapping the measured geometrical shape coordinates and the identified texture parameters to the predicted geometrical shape coordinates and the predicted texture parameters of the occluded portions of the at least one object.

21 Claims, 11 Drawing Sheets

(51) Int. Cl.
    *G06N 3/045*      (2023.01)
    *G06T 7/60*      (2017.01)
    *G06T 15/20*      (2011.01)

(58) Field of Classification Search
    CPC ...... G06T 15/04; G06N 3/045; G06N 3/0464; G06N 3/047; G06N 3/09; G06N 3/0455; G06F 3/011; G06F 3/015; G06F 3/016; G06V 20/647; G06V 20/64
    See application file for complete search history.

(56) References Cited

U.S. PATENT DOCUMENTS

| | | | |
|---|---|---|---|
| 10,853,975 B2 * | 12/2020 | Vosoughi | G06T 9/40 |
| 11,676,331 B2 * | 6/2023 | Takahashi | H04N 21/4728 345/419 |
| 11,887,241 B2 * | 1/2024 | Xu | G06T 15/20 |
| 2011/0148868 A1 | 6/2011 | Chang et al. | |
| 2013/0249908 A1 | 9/2013 | Black et al. | |
| 2019/0236810 A1 * | 8/2019 | Vosoughi | G06T 9/40 |
| 2019/0371080 A1 | 12/2019 | Sminchisescu et al. | |
| 2020/0074727 A1 | 3/2020 | Mulchandani | |
| 2020/0349758 A1 | 11/2020 | Paulson et al. | |
| 2021/0012550 A1 | 1/2021 | Orvalho et al. | |
| 2022/0198738 A1 * | 6/2022 | Xu | G06N 3/08 |

FOREIGN PATENT DOCUMENTS

| WO | 97/46975 A1 | 12/1997 |
|---|---|---|
| WO | 2017/029488 A2 | 2/2017 |
| WO | 2019/050808 A1 | 3/2019 |
| WO | 2019/140860 A1 | 7/2019 |

OTHER PUBLICATIONS

Li, Y., et al., "Shape-Texture Debiased Neural Network Training", arXiv:2010.05981v1 [cs.CV], Oct. 12, 2020, pp. 1-11.
Communication Issued on Jan. 4, 2023 By the Indian Patent Office In Corresponding Indian Patent Application No. 202141023155.
Thiemo Alldieck et al., "Tex2Shape: Detailed Full Human Body Geometry From a Single Image", 2019 IEEE/CVF International Conference on Computer Vision (ICCV), Oct. 27, 2019, pp. 2293-2303, DOI: 10.1109/ICCV.2019.00238, XP033724095.
Thiemo Alldieck et al., "Reconstructing 3D Human Avatars from Monocular Images", Real VR—Immersive Digital Reality, Mar. 3, 2020, pp. 188-218, DOI: 10.1007/978-3-030-41816-8_8, XP047545542.
Shunsuke Saito et al., "PIFu: Pixel-Aligned Implicit Function for High-Resolution Clothed Human Digitization", 2019, 15 pages, arXiv:1905.05172v3 [cs.CV], XP081544507.
Araceli Morales et al., "Survey on 3D face reconstruction from uncalibrated images", Nov. 11, 2020, 40 pages, arXiv:2011.05740v1 [cs.CV], XP081811555.
Caixia Liu et al., "Deep3D reconstruction: methods, data, and challenges", Frontiers of Information Technology & Electronic Engineering, vol. 22, No. 5, May 2021, pp. 652-672, DOI: 10.1631/FITEE.2000068, XP037467885.
Bernhard Egger et al., "3D Morphable Face Models—Past, Present, and Future", ACM Transactions on Graphics, Jun. 9, 2020, vol. 39, No. 5, Article No. 157, 38 Pages, DOI: 10.1145/3395208, XP058682630.
Xian-Feng Han et al., "Image-based 3D Object Reconstruction: State-of-the-Art and Trends in the Deep Learning Era", Jun. 2019, 28 pages, arXiv:1906.06543v2 [cs.CV], XP081382049.
Communication issued on Apr. 17, 2024 by the European Patent Office for European Patent Application No. 22811594.5.

* cited by examiner

FIG. 7
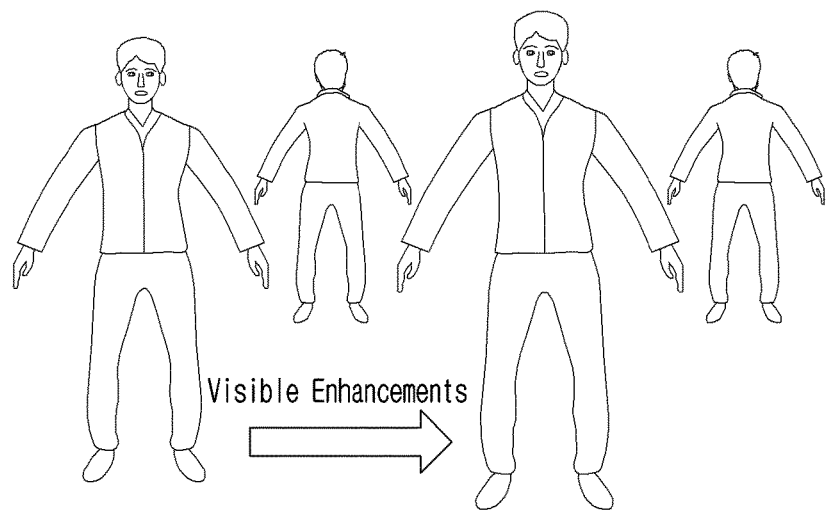
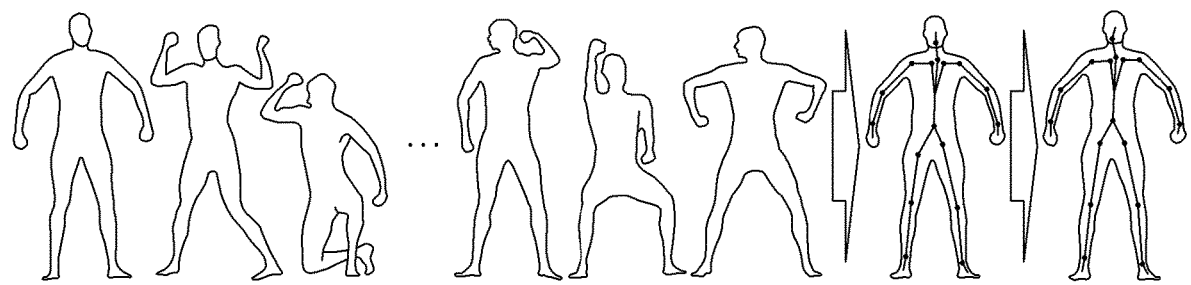
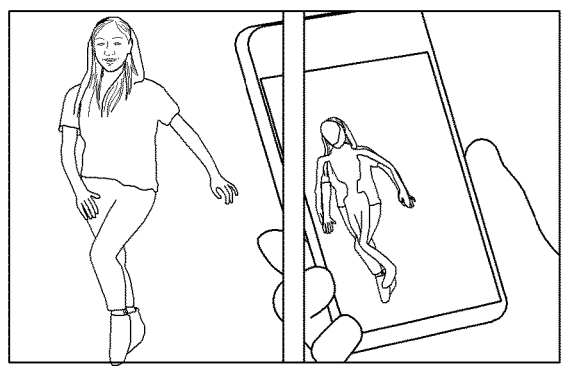

FIG. 8
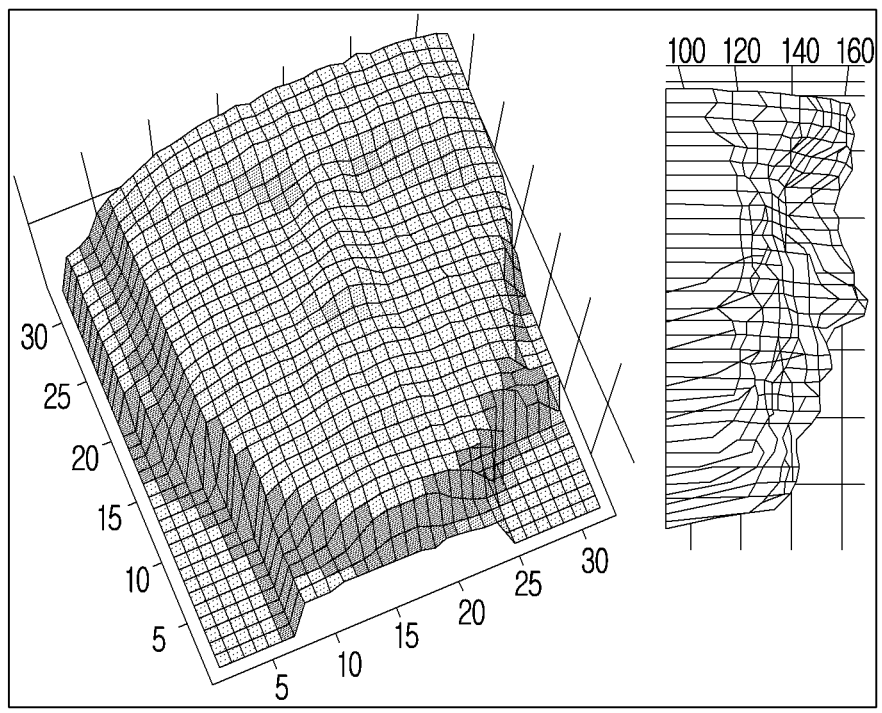
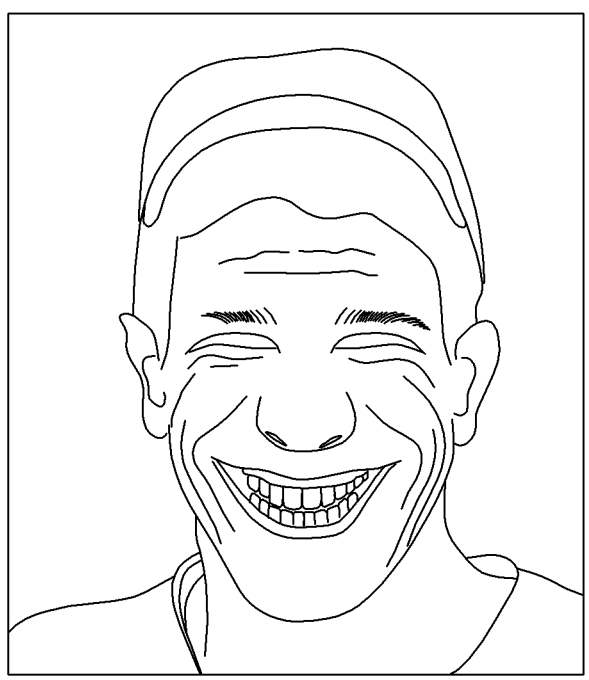

FIG. 10
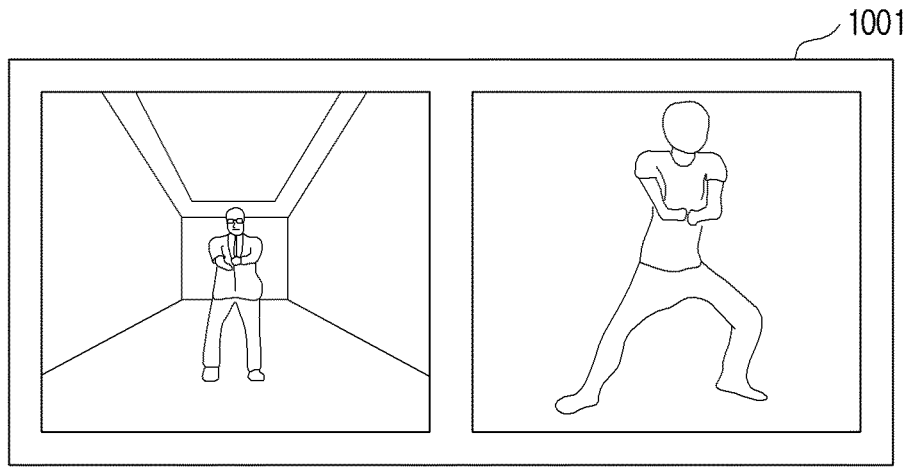
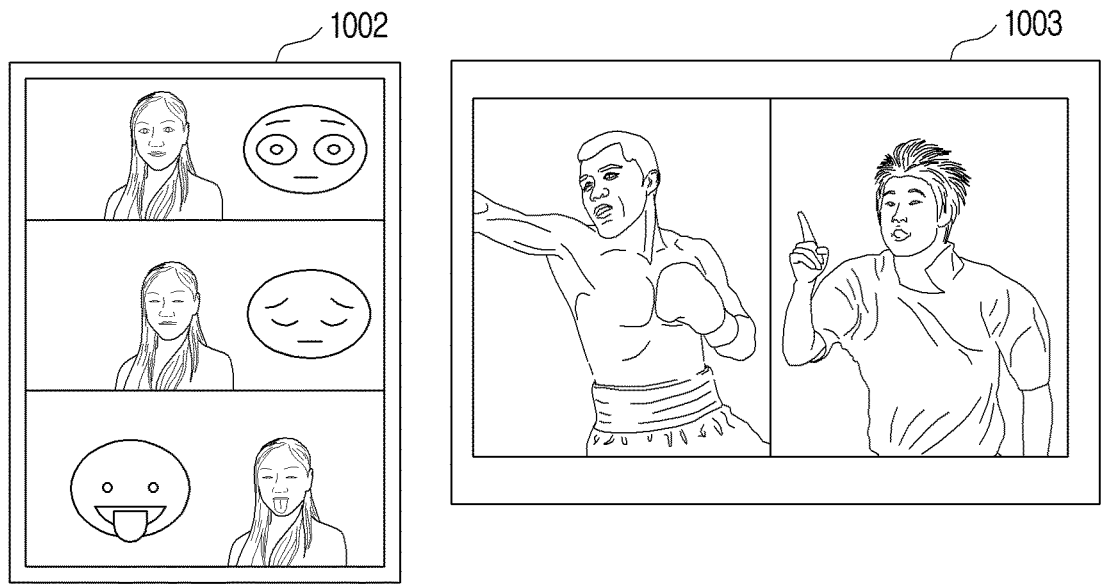
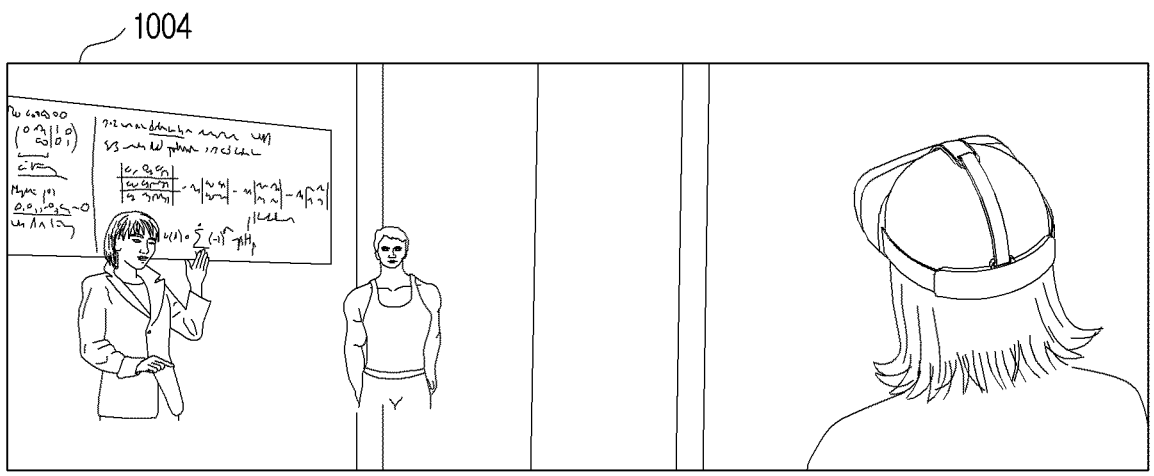

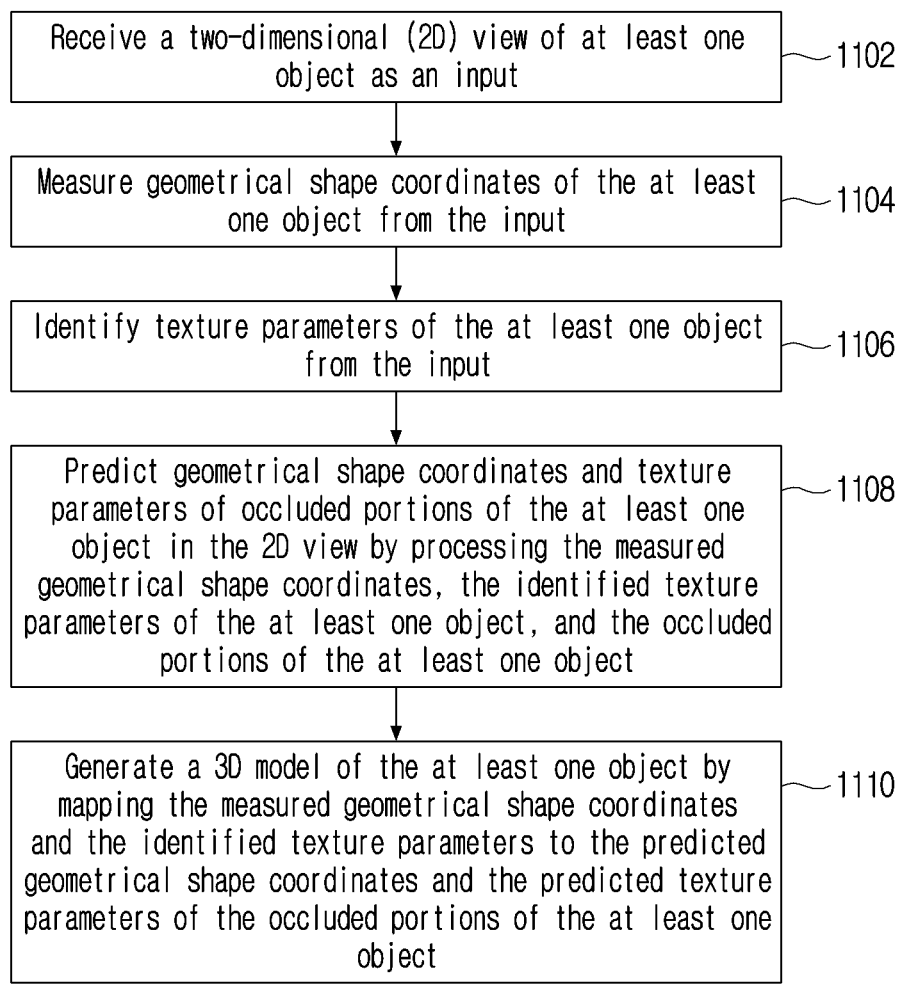

METHODS AND SYSTEMS FOR GENERATING THREE DIMENSIONAL (3D) MODELS OF OBJECTS

CROSS-REFERENCE TO RELATED APPLICATION(S)

This application is a bypass continuation of International Application No. PCT/KR2022/007301, filed on May 23, 2022, which is based on and claims priority to Indian Patent Application No. 202141023155, filed Apr. 11, 2022, in the Intellectual Property India, and Indian Patent Application No. 202141023155, filed May 24, 2021, in the Intellectual Property India the disclosures of which are incorporated by reference herein in their entireties.

BACKGROUND

1. Field

Embodiments of the present disclosure relate to generating three dimensional (3D) models and, more particularly, to generating a 3D model of an object by predicting finer details in a shape and predicting both visible texture and occluded texture from a two dimensional (2D) view of the object.

2. Description of the Related Art

Human centric Augmented Reality (AR) applications have generated high interest among consumers. The AR applications involve generation of 3D models for objects/human avatars. Existing methods such as a Structure from Motion (SFM) method, a Multichannel stroboscopic videography (MSV) method, a Maximum Voltage Gradient (MVG) method, and so on, may be used to generate the 3D models of the objects.

SUMMARY

The existing methods may use multiple images to generate the fully textured 3D models depending on a studio environment. Thus, the existing methods do not involve generating the 3D model of the object using a single image of the object.

In the existing methods, a 3D model of a human body may be generated using an AI 3D human generator. However, the AI generated 3D model misses important facial details and also finer details in the shape.

According to an aspect of the disclosure, there is provided a method for generating a three-dimensional (3D) model of an object that may include receiving, by an electronic device, a two-dimensional (2D) view of at least one object as an input, measuring, by the electronic device, geometrical shape coordinates of the at least one object from the input, identifying, by the electronic device, texture parameters of the at least one object from the input, predicting, by the electronic device, geometrical shape coordinates and texture parameters of occluded portions of the at least one object in the 2D view by processing the measured geometrical shape coordinates of the at least one object, the identified texture parameters of the at least one object, and the occluded portions of the at least one object, generating, by the electronic device, a 3D model of the at least one object by mapping the measured geometrical shape coordinates and the identified texture parameters to the predicted geometrical shape coordinates and the predicted texture parameters of the occluded portions of the at least one object.

The method may further include comparing, by the electronic device, the generated 3D model with at least one pre-learned ground truth 3D model; and enhancing, by the electronic device, the generated 3D model of the at least one object based on the comparison.

The at least one object may be at least one human body.

The receiving of the 2D view of the at least one object may include capturing the 2D view of the at least one object with a presence of a background and invariant to at least one of a pose of capture, an object to camera localization, and environmental lighting condition.

The measuring of the geometrical shape coordinates of the at least one object from the input may include training a first neural network by passing batches of 2D images through a series of convolutional encoders and decoders of the first neural network, wherein the first neural network is a deep convolutional network; and using the trained first neural network to measure the geometrical shape coordinates of the at least one object from the input.

The identifying of the texture parameters of the at least one object from the input may include training a second neural network by passing batches of 2D images through a series of deep Residual neural networks of the second neural network; and using the trained second neural network to identity the texture parameters of the at least one object.

The predicting of the geometrical shape coordinates and the texture parameters of the occluded portions of the at least one object in the 2D view may include processing the measured geometrical shape coordinates of the at least one object, the identified texture parameters of the at least one object, and the occluded portions of the at least one object by using a first module of a third neural network to predict normal maps for the at least one object, processing the measured geometrical shape coordinates of the at least one object, the identified texture parameters of the at least one object, and the occluded portions of the at least one object by using a second module of the third neural network to predict occluded portions normal maps for the at least one object from the predicted normal maps, and processing the measured geometrical shape coordinates of the at least one object, the identified texture parameters of the at least one object, and the occluded portions of the at least one object by using a third module of the third neural network to predict a texture map of the occluded portions of the at least one object using a training input, wherein the normal maps and the occluded portions normal maps indicate the geometrical shape coordinates of the occluded portions of the at least one object at multiple scales, and the texture map indicates the texture parameters of the occluded portions of the at least one object.

The first, second and third modules of the third neural network may include separate convolutional neural networks or generative adversarial networks, the first module may be trained to predict the normal maps from the input, the second module may be trained to predict the occluded portions normal maps from the predicted normal maps, and the third module may be trained to predict the texture parameters of the occluded portions using the input.

The third neural network may be trained in a plurality of epochs, and the training of the third neural network at each epoch of the plurality of epochs may include sampling surface points and texture RGB values from a training input, the training input including the batches of 2D images, identifying misclassified surface points from previous epochs and providing weightage to the misclassified surface points, training the third neural network based on the identified misclassified surface points to predict the geometrical shape coordinates and the texture parameters of the occluded portions of each object present in the training input, deriving a cost function to calculate an accuracy of the third neural network in predicting the geometrical shape coordinates and the texture parameters of the occluded portions of each object present in the training input, the cost function being a weighted sum of losses computed with respect to the geometrical shape coordinates and the texture parameters, and back propagating the cost function to the third neural network to train the third neural network iteratively.

A fourth neural network may be used to detect the occluded portions of the at least one object, and the fourth neural network may include a Conditional Generative Adversarial Network (CGAN).

The generating of the 3D model of the at least one object may include computing a first loss based on 3D vertices extracted by mapping the measured geometrical shape coordinates of the at least one object to the predicted geometrical shape coordinates of the occluded portions of the at least one object, computing a second loss based on color information extracted by mapping the identified texture parameters of the at least one object to the predicted texture parameters of the occluded portions of the at least one object, computing an ensemble loss by aggregating the computed first loss and the computed second loss by using an empirical correlation model between shape and texture over resampling, forming a colored mesh based on the computed ensemble loss, the extracted 3D vertices and the color information, and processing the colored mesh to generate the 3D model of the at least one object.

The 3D model of the at least one object may include scopes for custom Augmented Reality (AR) fittings for differentiated content creation.

The enhancing of the generated 3D model of the at least one object may include enhancing the geometrical shape coordinates of the 3D model of the at least one object by using a convergence of the first loss and the second loss.

The method may further include minimizing the convergence of the first loss and the second loss by comparing ensemble losses computed using sampling points bootstrapped from the at least one ground truth 3D model separately for the geometrical shape coordinates and the texture parameters of the 3D model, aggregating the ensemble losses for all the sampling points during iterative passes over a dithering region of Region of Interest (ROT) boundary of the 3D model, and back propagating the aggregated ensemble losses to the first neural network to train the first neural network iteratively.

According to an aspect of the disclosure, there is provided an electronic device a processor and a memory storing instructions executable by the processor, where the processor may be coupled to the memory and configured to receive a two-dimensional (2D) view of at least one object as an input, measure geometrical shape coordinates of the at least one object from the input, identify texture parameters of the at least one object from the input, predict geometrical shape coordinates and texture parameters of occluded portions of the at least one object in the 2D view by processing the measured geometrical shape coordinates of the at least one object, the identified texture parameters of the at least one object, and the occluded portions of the at least one object, and generate a three-dimensional (3D) model of the at least one object by mapping the measured geometrical shape coordinates and the identified texture parameters to the predicted geometrical shape coordinates and the predicted texture parameters of the occluded portions of the at least one object.

According to an aspect of the disclosure, there is provided a non-transitory computer-readable recording medium having recorded thereon a program for executing the method for generating a three-dimensional (3D) model of the object.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments of the disclosure are illustrated in the accompanying drawings, throughout which like reference letters indicate corresponding parts in the various figures. The above and other aspects, features, and advantages of the embodiments of the disclosure will be better understood from the following description with reference to the drawings, in which:

FIG. 7 depicts example 3D models of a human body generated and enhanced according to embodiments of the disclosure;

FIG. 8 depicts an example 3D model with the added liveliness to a face of the human according to embodiments of the disclosure;

FIG. 10 is an example diagram depicting applications in which the method of generating the 3D models from the single image may be deployed according to embodiments of the disclosure; and FIG. 11 is a flow chart depicting a method for generating the 3D model of the object according to embodiments of the disclosure.

DETAILED DESCRIPTION

Figure 1:
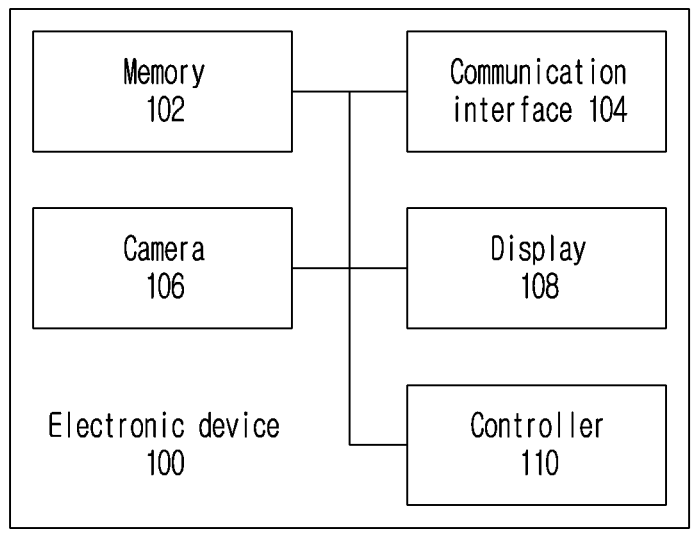
FIG. 1 depicts an electronic device according to embodiments of the disclosure.

The example embodiments of the disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments. The description is intended merely to facilitate an understanding of ways in which the example embodiments can be practiced and to further enable those of skill in the art to practice the example embodiments. Accordingly, the disclosure should not be construed as limiting the scope of the example embodiments.

Embodiments of the disclosure relate to methods and systems for generating a three dimensional (3D) model of an object or a human avatar using a single two-dimensional (2D) image.

Referring now to the drawings, and more particularly to FIGS. 1 through 11, where similar reference characters denote corresponding features consistently throughout the figures, there are shown example embodiments.

FIG. 1 depicts an electronic device 100 according to embodiments of the disclosure. The electronic device 100 may be a computing device configured to generate a three dimensional (3D) model for an object. In an embodiment, the electronic device 100 may generate the 3D model for the object by using a single two dimensional (2D) image or view of the object.

Examples of the electronic device 100 may be, but are not limited to, a cloud computing device (e.g., a part of a public cloud or a private cloud), a server, a database, a computing device, and so on. The server may be at least one of a standalone server, a server on a cloud, or the like. The computing device may be, but is not limited to, a personal computer, a notebook, a tablet, a desktop computer, a laptop, a handheld device, a mobile device, a camera, an Internet of Things (IoT) device, an Augmented Reality (AR)/Virtual Reality (VR) device, and so on. Also, the electronic device 100 may be at least one of a microcontroller, a processor, a System on Chip (SoC), an integrated chip (IC), a microprocessor based programmable consumer electronic device, and so on.

The 3D model may be a mathematical representation of any 3D object. In an embodiment, the 3D model may include at least one of a fully textured 3D image, a fully textured 3D animated image/video, a fully texture 3D video/Graphic Interchange Format (GIF), and so on. The 3D model of the object generated according to embodiments of the disclosure may be used in various applications which require easy capture of the image, faster computation, and realistic quality. Examples of the applications may be, but are not limited to, AR applications, VR applications, Artificial Intelligence (AI) based 3D vision applications, personalized human content generation applications, e-commerce websites where an end user can check how different attire sized fit their body in a real-time, virtual try based applications, e-shopping applications, tele-presence based applications, short animations based applications, selfie based applications, or any other similar applications. In an example, the AR applications may include at least one of AR video calls, AR video editors, AR glasses, and so on.

Examples of the object may be, but are not limited to, a human avatar, a human being, a human body, a thing, a game avatar, a game avatar of real people/celebrities, or any other three dimensional entity.

Examples of the 2D image may be, but are not limited to, a captured image, an animated image, an image found on websites, an image captured from a social networking site, a screenshot, an image stored in a memory, and so on. In an example, the 2D image may be at least one of a still image, a moving image, a Graphic Interchange Format (GIF), and so on. In an example, the 2D image of the object used for generating the 3D model may be captured under various conditions. Examples of the conditions may be, but are not limited to, a fully body clothed human, with presence of any background and invariant to at least one of a pose of capture, object to camera localization and environmental lighting conditions, and so on.

The electronic device 100 may include a memory 102, a communication interface 104, a camera 106, a display 108, and a controller 110. The electronic device 100 may also communicate with one or more external devices using a communication network (not shown) to receive an image of at least one object. Examples of the external devices may be, but are not limited to, a server, a database, and so on. The communication network may include at least one of, but is not limited to, a wired network, a value added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on.

The memory 102 may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The memory 102 may store at least one of the 2D images of the objects and the corresponding 3D models, texture and geometrical coordinates obtained from the 2D image, and so on.

Figure 2:
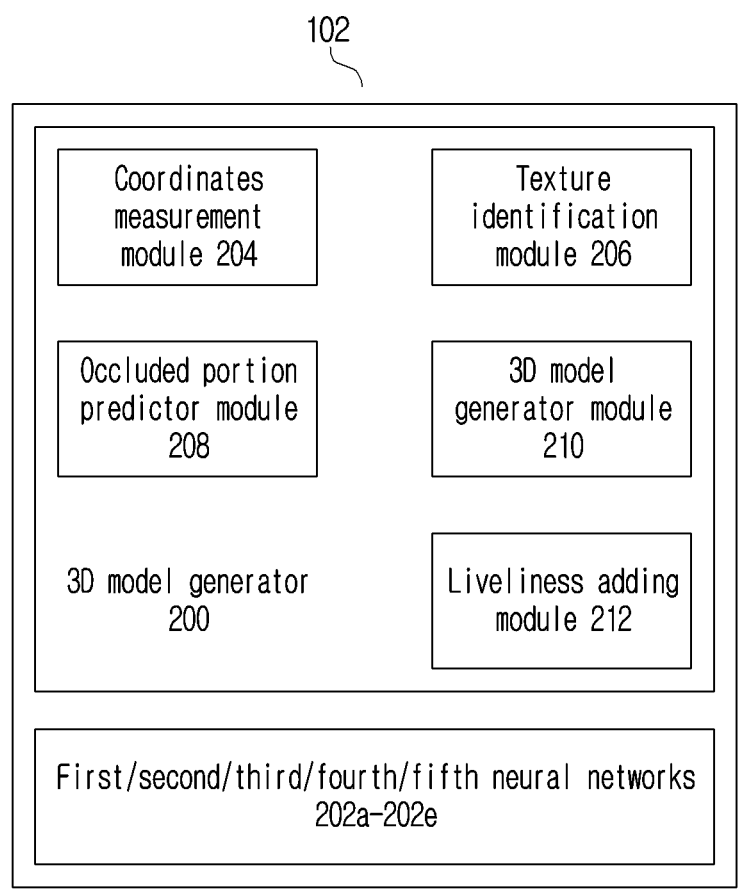
FIG. 2 depicts a memory including a three dimensional (3D) model generator performable in the electronic device to generate 3D models for objects according to embodiments of the disclosure.

Referring to FIG. 2, the memory 102 may also store a plurality of neural networks, for example, a first neural network 202a, a second neural network 202b, a third neural network 202c, a fourth neural network 202d, and a fifth neural network 202e. The plurality of neural networks 202a, 202b, 202c, 202d and 202e may be used for generating the 3D models. A function of each neural network of the plurality of neural networks is described later.

Examples of the first to fifth neural networks 202a, 202b, 202c, 202d and 202e may be, but are not limited to, a deep neural network (DNN), an Artificial Intelligence (AI) model, a machine learning (ML) model, a multi-class Support Vector Machine (SVM) model, a Convolutional Neural Network (CNN) model, a recurrent neural network (RNN), a stacked hourglass network, a restricted Boltzmann Machine (RBM), a deep belief network (DBN), a bidirectional recurrent deep neural network (BRDNN), a generative adversarial network (GAN), a regression based neural network, a deep reinforcement model (with ReLU activation), a deep Q-network, a residual network, a Conditional Generative Adversarial Network (CGAN), and so on.

Each of the first to fifth neural networks 202a, 202b, 202c, 202d and 202e may include a plurality of nodes which may be arranged in the layers. Examples of the layers may be, but are not limited to, a convolutional layer, an activation layer, an average pool layer, a max pool layer, a concatenated layer, a dropout layer, a fully connected (FC) layer, a SoftMax layer, and so on. Each layer has a plurality of weight values and performs a layer operation through calculation of a previous layer and an operation of a plurality of weights or coefficients. A topology of the layers of the first to fifth neural networks 202a, 202b, 202c, 202d and 202e may vary based on the type of the respective network. In an example, each of the first to fifth neural networks 202a, 202b, 202c, 202d and 202e may include an input layer, an output layer, and a hidden layer. The input layer receives a layer input and forwards the received layer input to the hidden layer. The hidden layer transforms the layer input received from the input layer into a representation, which can be used for generating the output in the output layer. The hidden layers extract useful and low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients or weights respectively associated with each of the edges connecting the layers.

Each of the first to fifth neural networks 202a, 202b, 202c, 202d and 202e may be trained using at least one learning method to perform at least one intended function. Examples of the learning method may be, but are not limited to, supervised learning, unsupervised learning, semi-supervised learning, reinforcement learning, regression-based learning, and so on. Each of the trained first to fifth neural network 202a, 202b, 202c, 202d and 202e may be a neural network model in which a number of layers, a sequence for processing the layers and parameters related to each layer may be known and fixed for performing the at least one intended function. Examples of the parameters related to each layer may be, but are not limited to, activation functions, biases, input weights, output weights, and so on, related to the layers of each of the first to fifth neural networks 202a, 202b, 202c, 202d and 202e. A function associated with the learning method may be performed through the non-volatile memory, the volatile memory, and the controller 110. The controller 110 may include one or a plurality of processors. At this time, the one or a plurality of processors may be a general purpose processor such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors may perform the at least one intended function in accordance with a predefined operating rule of the first to fifth neural networks 202a, 202b, 202c, 202d and 202e stored in the non-volatile memory and the volatile memory. Predefined operating rules of the first to fifth neural networks 202a, 202b, 202c, 202d and 202e are provided through training the modules using the learning method.

Here, being provided through learning means that, by applying the learning method to a plurality of learning data, a predefined operating rule, or the first to fifth neural networks 202a, 202b, 202c, 202d and 202e of a desired characteristic is made. The intended functions of the first to fifth neural networks 202a, 202b, 202c, 202d and 202e may be performed in the electronic device 100 itself in which the learning according to an embodiment is performed, and/or may be implemented through a separate server system.

The communication interface 104 may be configured to enable the electronic device 100 to communicate with the one or more external devices by using communication methods supported by the communication network. The communication interface 104 may include the components such as a wired communicator, a short-range communicator, a mobile communicator, and a broadcasting receiver. The wired communicator may enable the electronic device 100 to communicate with the external devices by using the communication methods such as, but are not limited to, wired LAN, the Ethernet, and so on. The short-range communicator may enable the electronic device 100 to communicate with the external devices by using the communication methods such as, but are not limited to, Bluetooth low energy (BLE), near field communicator (NFC), WLAN (or Wi-fi), Zigbee, infrared data association (IrDA), Wi-Fi direct (WFD), UWB communication, Ant+ (interoperable wireless transfer capability) communication, shared wireless access protocol (SWAP), wireless broadband internet (Wibro), wireless gigabit alliance (WiGiG), and so on. The mobile communicator may transceive wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 100 may or may not include the broadcasting receiver.

The camera 106 may be configured to capture the image of the one or more objects. In an example, the camera 106 may be a RGB camera.

The display 108 may be configured to enable a user to interact with the electronic device 100. The display 108 may also be configured to display the 3D model of the object to the user.

The controller 110 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 110 may be configured to generate or reconstruct the 3D model of the object from the single 2D view of the object or the single 2D image of the object.

To generate the 3D model, the controller 110 receives the 2D view of the object as an input. In an example, the controller 110 may receive the input from the memory 102, which is selected by the user for generating the associated 3D model. In another example, the controller 110 may receive the input from the at least one external entity or device.

The controller 110 measures geometrical shape coordinates of the object from the input. The geometrical shape coordinates of the object may be measured from visible view, parts, or portions of the object in the input. The measured geometrical shape coordinates may be in 3D coordinates.

In an embodiment, the controller 110 measures the geometrical shape coordinates of the object from the input by using the first neural network 202a. In an example, the first neural network 202a may be a deep convolutional network comprising a series of convolutional encoders and decoders. For measuring the geometrical shape coordinates of the object from the input, the controller 110 trains the first neural network 202a by passing batches of 2D images through the series of the convolutional encoders and decoders of the first neural network 202a to measure the geometric shape of coordinates of the objects from the 2D images. The controller 110 uses the trained first neural network 202a to measure the geometrical shape coordinates of the object from the input. Embodiments in the disclosure use the terms such as "coordinates", "geometry", "shape", "geometrical shape coordinates", and so on, interchangeably through the disclosure.

On measuring the geometrical shape coordinates of the object, the controller 110 identifies texture parameters of the object from the input. The texture parameters of the object may be identified from the visible view, parts, or portions of the object in the input. The identified texture parameters may be RGB values.

In an embodiment, the controller 110 uses the second neural network 202b to identify the texture parameters of the object from the input. In an example, the second neural network 202b may be a deep neural network comprising a series of Residual neural networks. For identifying the texture parameters, the controller 110 trains the second neural network 202b by passing the batches of 2D images through the series of the Residual neural networks of the second neural network 202b to identify the texture parameters of the object. The controller 110 uses the second neural network 202b to identify the texture parameters or texture of the object. Embodiments in the disclosure use the terms such as "texture parameters", "texture", and so on, interchangeably through the disclosure.

The controller 110 predicts geometrical shape coordinates and texture parameters of occluded portions of the object in the 2D view. The occluded portions refer to hidden portions, unavailable views or unseen views of the object in the image. For example, consider that a human being or an object is facing front in an image. In such a scenario, the occluded portions may include back portions of the human being. In an embodiment, the controller 110 uses a third neural network 202c to determine the geometrical shape coordinates and texture parameters of the occluded portions of the object in the 2D view. In an example, the third neural network 202c may be a deep neural network (DNN). In an embodiment, the controller 110 uses a fourth neural network 202d to determine the occluded portions of the object from the input. In an example, the fourth neural network 202d may be the CGAN.

The controller 110 predicts the geometrical shape coordinates and the texture parameters of the occluded portions of the object in the 2D view by processing the measured geometrical shape coordinates, the identified texture parameters of the at least one object, and the occluded portions of the at least one object using the third neural network 202c. The controller 110 initially trains the third neural network 202c and uses the trained third neural network 202c to predict the geometrical shape coordinates and the texture parameters of the occluded portions of the object in the 2D view.

The controller 110 trains the third neural network 202c in a plurality of epochs. At each epoch of the plurality of epochs, the controller 110 samples surface points and texture values from a training input to be provided to the third neural network 202c. The training input includes the batches of 2D images, where each image of the 2D images comprises the one or more objects. The controller 110 identifies misclassified surface points from previous epochs and provides weightage to the misclassified surface points. The controller 110 trains the third neural network 202c based on the identified misclassified surface points to predict the geometrical shape coordinates and the texture parameters of the occluded portions of each object present in the training input. The controller 110 derives a cost function to calculate an accuracy of the third neural network 202c in predicting the geometrical shape coordinates and the texture parameters of the occluded portions of each object present in the training input. The cost function may be a weighted sum of losses computed with respect to the geometrical shape coordinates and the texture parameters. The controller 110 backpropagates the cost function to the third neural network 202c to train the third neural network 202c iteratively. The third neural network 202c may include a first module, a second module, and a third module. The first module may be trained to predict normal maps. The second module may be trained to predict normal maps of the occluded portions. The third module may be trained to predict texture parameters from the input.

The controller 110 uses the trained third neural network 202c to predict the geometrical shape coordinates and the texture parameters of the occluded portions of each object present in the input 2D view. For predicting the geometrical shape coordinates and the texture parameters of the occluded portions of each object present in the input 2D view, the controller 110 processes the measured geometrical shape coordinates, the identified texture parameters of the object, and the occluded portions of the object using the first module of the third neural network 202c to predict normal maps. On predicting the normal maps, the controller 110 processes the measured geometrical shape coordinates, the identified texture parameters of the object, and the occluded portions of the object using the second module of the third neural network 202c to predict occluded portions normal maps for the object from the predicted normal maps. The occluded portions normal maps depict the normal maps of the occluded portions. On predicting the normal maps and the occluded portions normal maps, the controller 110 processes the measured geometrical shape coordinates, the identified texture parameters of the object, and the occluded portions of the object using the third module of the third neural network 202c to predict a texture map of the occluded portions of the object using the training input. The normal maps and the occluded portions normal maps indicate the geometrical shape coordinates of the occluded portions of the object at multiple scales. The texture map indicates the texture parameters of the occluded portions of the object.

On predicting the geometrical shape coordinates and the texture map of the occluded portions of the object, the controller 110 generates the 3D model of the object by mapping the measured geometrical shape coordinates and the identified texture parameters to the predicted geometrical shape coordinates and the texture parameters of the occluded portions of the object.

To generate the 3D model, the controller 110 extracts 3D vertices by mapping the measured geometrical shape coordinates of the visible view or portions of the object to the predicted geometrical shape coordinates of the occluded portions of the object. The controller 110 computes a first loss based on the extracted 3D vertices. The first loss may correspond to a shape loss or a texture shape loss. Embodiments herein use the terms such as "first loss", "shape loss", "geometry loss or error", "texture shape loss", and so on, interchangeably to refer to a loss computed with the respect to the 3D vertices. The controller 110 extracts color information by mapping the identified texture parameters of the object from the visible view or portions to the predicted texture parameters of the occluded portions of the object. In an embodiment, the 3D vertices and the color information may form colored vertices. The controller 110 computes a second loss based on the color information. The second loss may correspond to a texture loss. Embodiments herein use the terms such as "second loss", "texture loss", "texture guided loss", and so on, interchangeably to refer to a loss computed with respect to the color information. The controller 110 computes an ensemble loss by aggregating the computed first loss and the second loss using an empirical correlation model between shape and texture over resampling. The controller 110 forms a colored mesh based on the computed ensemble loss, the extracted 3D vertices, and the color information. The controller 110 processes the colored mesh to generate the 3D model of the object. The 3D model of the object includes a scope for custom AR fittings for differentiated content creation. Embodiments herein use the terms such as, but are not limited to, "3D model", "3D mesh", "colored vertices mesh", and so on, interchangeably through the document.

On generating the 3D model of the object, the controller 110 compares the generated 3D model with a pre-learned ground truth 3D model. In an example, the ground truth 3D model may be a ground truth 3D human model, a ground truth 3D face model, and so on. The controller 110 enhances the generated 3D model of the object based on the comparison.

To enhance the generated 3D model of the object, the controller 110 enhances the geometrical shape coordinates of the 3D model of the object using a convergence of the first loss and the second loss. Further, the controller 110 minimizes the convergence of the first loss and the second loss by comparing ensemble losses computed using sampling points bootstrapped from the ground truth 3D model separately for the geometrical shape coordinates and the texture parameters of the 3D model. The controller 110 aggregates the ensemble losses for all the sampling points during iterative passes over a dithering region of Region of Interest (ROT) boundary of the 3D model. The controller 110 back propagates the aggregated ensemble losses to the third neural network 202c to train the third neural network 202c iteratively to enhance the geometrical shape coordinates of the 3D model, thereby predicting the finer details in the shape of the object in the 3D model.

The controller 110 may also be configured to add liveliness to the 3D model of the object. In an example, if the object is a human being, then the controller 110 may add liveliness specially to body parts such as, but are not limited to, a face region, a nose, eyes, cheeks, hair, and so on.

To add the liveliness to the 3D model of the object, the controller 110 performs a surface normal based view prediction to correct one or more parameters of the 3D model. Examples of the parameters of the 3D model may be, but are not limited to, lighting condition, shades, and so on. The controller 110 creates a feature pool using the fifth neural network 202e. In an example, the fifth neural network 202e may be an Artificial Intelligence (AI) model or an AI based 3D face model. The feature pool includes at least one of, but is not limited to, expressions, liveliness effects, normal effects, and so on. Examples of the expressions may be, but are not limited to, sad, happy, scared, surprised, and so on. The controller 110 adds the liveliness to some parts of the object (for example, the face region, the nose, the eyes, or the like) in the 3D model based on the surface normal based view prediction and the created feature pool.

FIG. 2 depicts the memory 102 which may store a 3D model generator 200 performable in the electronic device 100 to generate the 3D models for the objects, according to embodiments of the disclosure. The 3D model generator 200 may be executed or processed by the controller 110 of the electronic device 100 to generate the 3D models for the objects. The 3D model generator 200 includes a coordinates measurement module 204, a texture identification module 206, an occluded portion predictor module 208, a 3D model generator module 210, and a liveliness adding module 212.

The coordinates measurement module 204 may be configured to measure the geometrical shape coordinates of the object from the visible portions of the object in the 2D view by using the first neural network 202a. The measured geometrical shape coordinates may be in the 3D coordinates.

The texture identification module 206 may be configured to identify the texture parameters of the object from the visible portions of the object in the 2D view by using the second neural network 202b. The identified texture parameters may be RGB values.

The occluded portion predictor module 208 may be configured to detect the occluded portions of the object from the 2D view by using the fourth neural network 202d which may be the CGAN. The occluded portion predictor module 208 may also be configured to predict the geometrical shape coordinates and the texture parameters of occluded portions of the object in the 2D view by processing the measured geometrical shape coordinates, the identified texture parameters of the object, and the occluded portions of the object by using the first, second, and third modules of the third neural network 202c.

The 3D model generator module 210 may be configured to generate the 3D model of the object by mapping the measured geometrical shape coordinates and the identified texture parameters to the predicted geometrical shape coordinates and the texture parameters of the occluded portions of the object.

The 3D model generator module 210 may also be configured to enhance the generated 3D model. The 3D model generator module 210 compares the generated 3D model with the pre-learned ground truth 3D model. The 3D model generator module 210 enhances the generated 3D model of the object based on the comparison.

The liveliness adding module 212 may be configured to add the liveliness to the specific parts of the object in the 3D model. The liveliness adding module 212 performs the surface normal based view prediction to correct the one or more parameters of the 3D model. The liveliness adding module 212 creates the feature pool using the fifth neural network 202e which may be an AI based face model. The liveliness adding module 212 then adds the liveliness to the specific parts of the object in the 3D model based on the surface normal based view prediction and the created feature pool.

FIGS. 1 and 2 show example blocks of the electronic device 100, but it is to be understood that other embodiments are not limited thereon. In other embodiments, the electronic device 100 may include less or more number of blocks. Further, the labels or names of the blocks are used only for illustrative purpose and does not limit the scope of the embodiments. One or more blocks can be combined together to perform same or substantially similar function in the electronic device 100.

Figure 3:
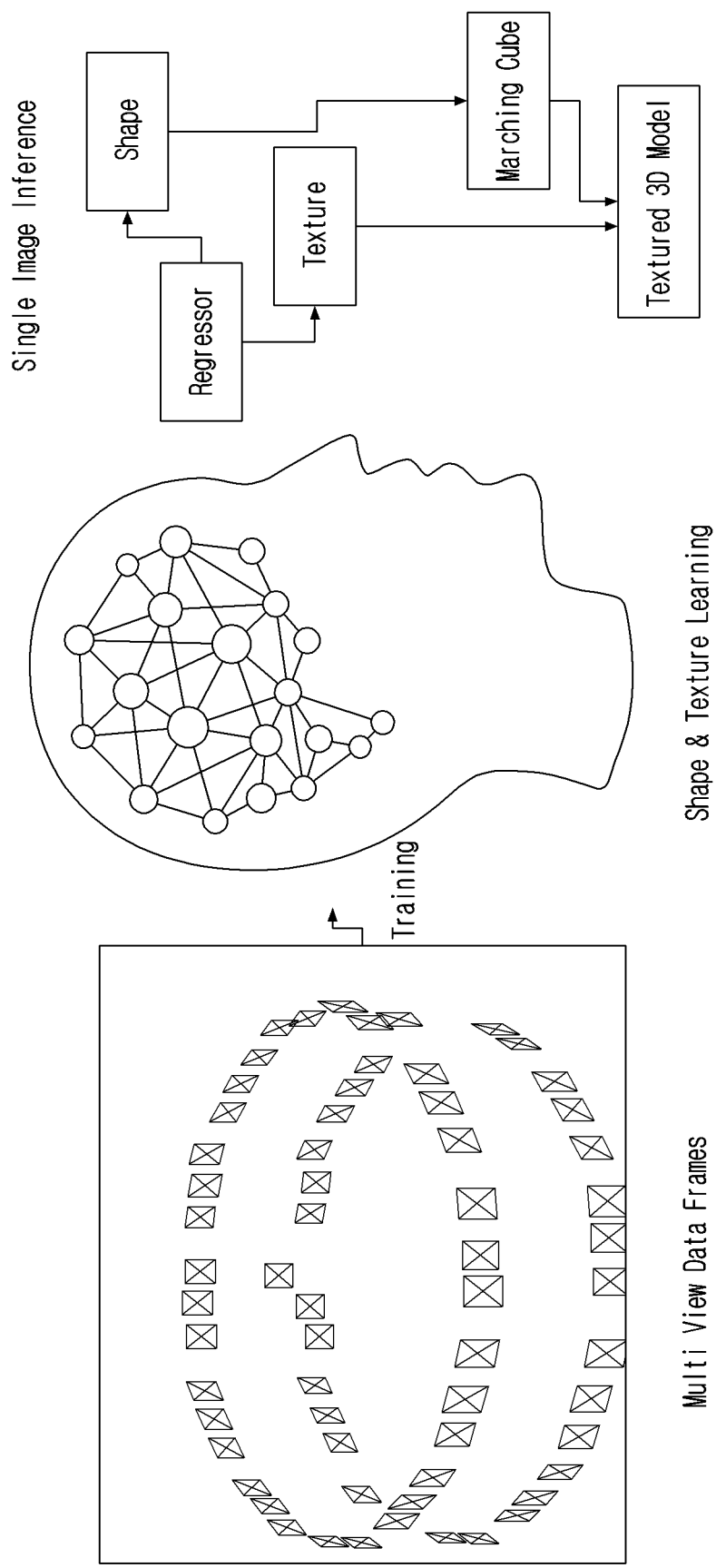
FIG. 3 is an example conceptual diagram depicting generation of a 3D model of an object according to embodiments of the disclosure.

FIG. 3 is an example conceptual diagram depicting generation of the 3D model of the object according to embodiments of the disclosure. The embodiments enable the electronic device 100 to generate or reconstruct the 3D model of the object by predicting finer details in the shape and predicting both visible texture and occluded texture from the single image of the object. The finer details in the shape may be preserved by using the surface normal based view prediction. The texture information may be enhanced by using the GAN/Generative adversarial techniques for the unseen views of the object.

The embodiments enable the electronic device 100 to use the plurality of neural networks 202a, 202b, 202c, 202d and 202e to retrieve the spatial and textual features or parameters from the single image instead of stereo matching methods.

The embodiments enable the electronic device 100 to reconstruct the 3D model for the human avatar, which may not be generalized with normal object reconstruction methods of the related art.

The embodiments enable the electronic device 100 to generate the 3D model without:
  generating a depth image of the 3D model in any of intermediate steps of generating the 3D model;
  requiring any face detection methods to generate the 3D model; and
  requiring any pre-processing steps like key point detection or any shape priors. The single image of the object may be used, all information using the monolithic neural network may be derived and the 3D model may be outputted finally. The normal maps may be used to enhance the finer shape details in the 3D model surface.

Figure 4:
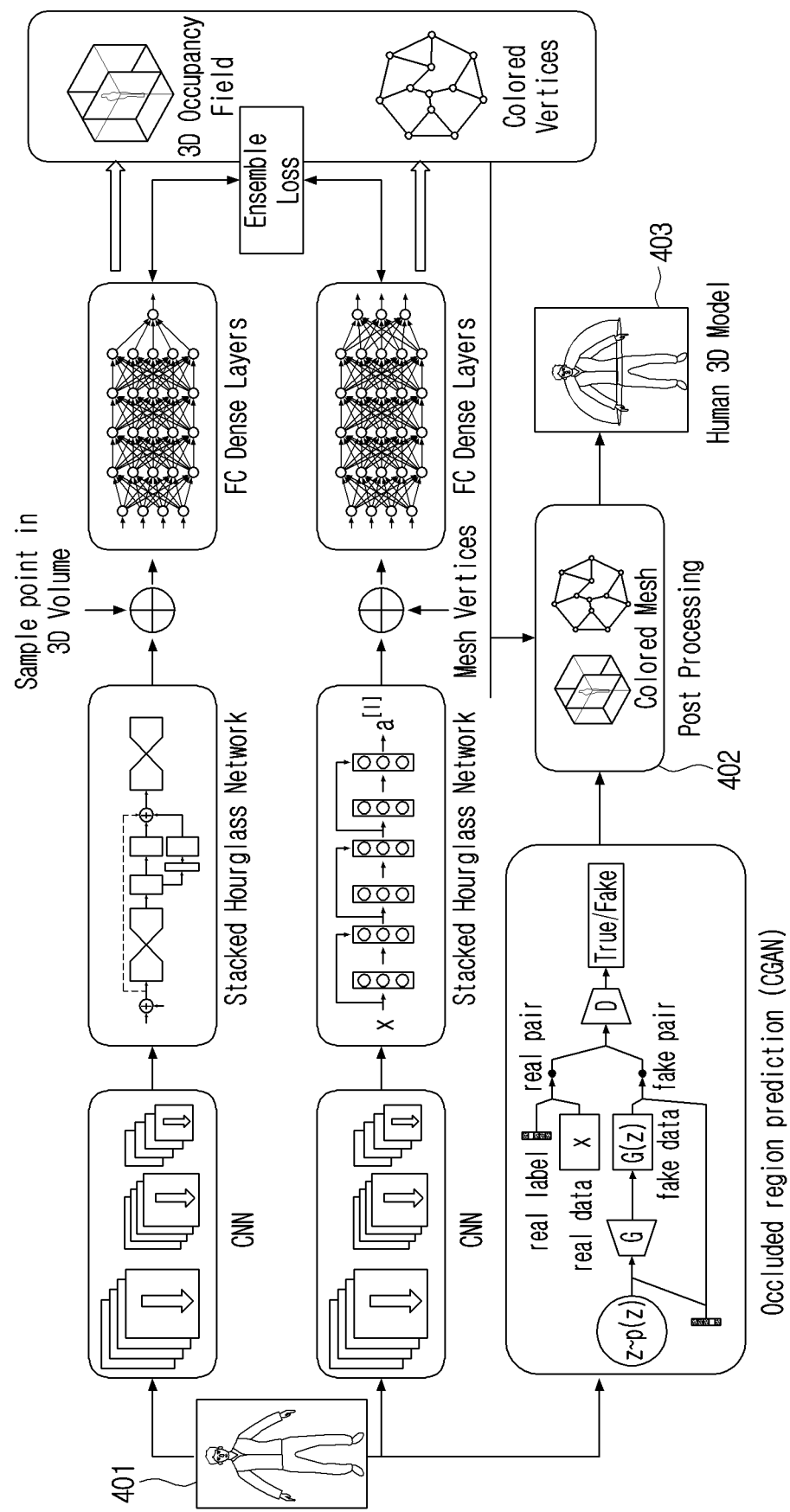
FIG. 4 is an example diagram depicting generation or reconstruction of the 3D model for a human avatar according to embodiments of the disclosure.

FIG. 4 is an example diagram depicting the generation or reconstruction of the 3D model for a human avatar according to embodiments of the disclosure. The embodiments enhance geometry prediction and texture mapping to a 3D human mesh (i.e., the 3D model) by using the guided ROI masking.

The electronic device 100 receives the input as a 2D view or image 401 of the object. In an example, the 2D image 401 may include a full body clothed human captured by using a RGB camera with presence of any background and invariant to the pose of capture, the object to camera localization, and environmental lighting conditions.

The electronic device 100 uses the first neural network 202a which may be the deep convolutional network including the series of convolutional encoders and decoders to measure the geometrical shape coordinates of the human avatar from the visible view. The electronic device 100 regresses the geometrical shape coordinates in a 3D occupancy field from the multi-level RGB features learned from the 3D ground truth human model. The electronic device 100 uses the second neural network 202b including the series of Residual neural networks to identify the texture parameters from the 2D image (i.e., from the visible view). The electronic device 100 uses the CGAN and determines the occluded portions of the human avatar in the 2D image 401.

The electronic device 100 predicts the geometrical shape coordinates and the texture parameters of the occluded portions by analyzing the geometrical shape coordinates and the texture parameters, and the occluded portions using the third neural network 202c. The electronic device 100 generates the 3D model 403 of the human avatar by mapping the geometrical shape coordinates and the texture parameters to the geometrical shape coordinates and the texture parameters of the occluded portions.

To generate the 3D model, the electronic device 100 computes the first loss based on the 3D vertices extracted by mapping the measured geometrical shape coordinates of the human avatar to the predicted geometrical shape coordinates of the occluded portions of the human avatar. The electronic device 100 computes the second loss based on the color information extracted by mapping the identified texture parameters of the human avatar to the predicted texture parameters of the occluded portions of the human avatar. The electronic device 100 computes the ensemble loss by aggregating the computed first loss and the computed second loss by using the empirical correlation model between shape and texture over resampling. The electronic device 100 then forms the colored mesh 402 based on the computed ensemble loss, the extracted 3D vertices and the color information. The electronic device 100 further processes the colored mesh 402 to generate the 3D model 403 of the human avatar.

Figure 5:
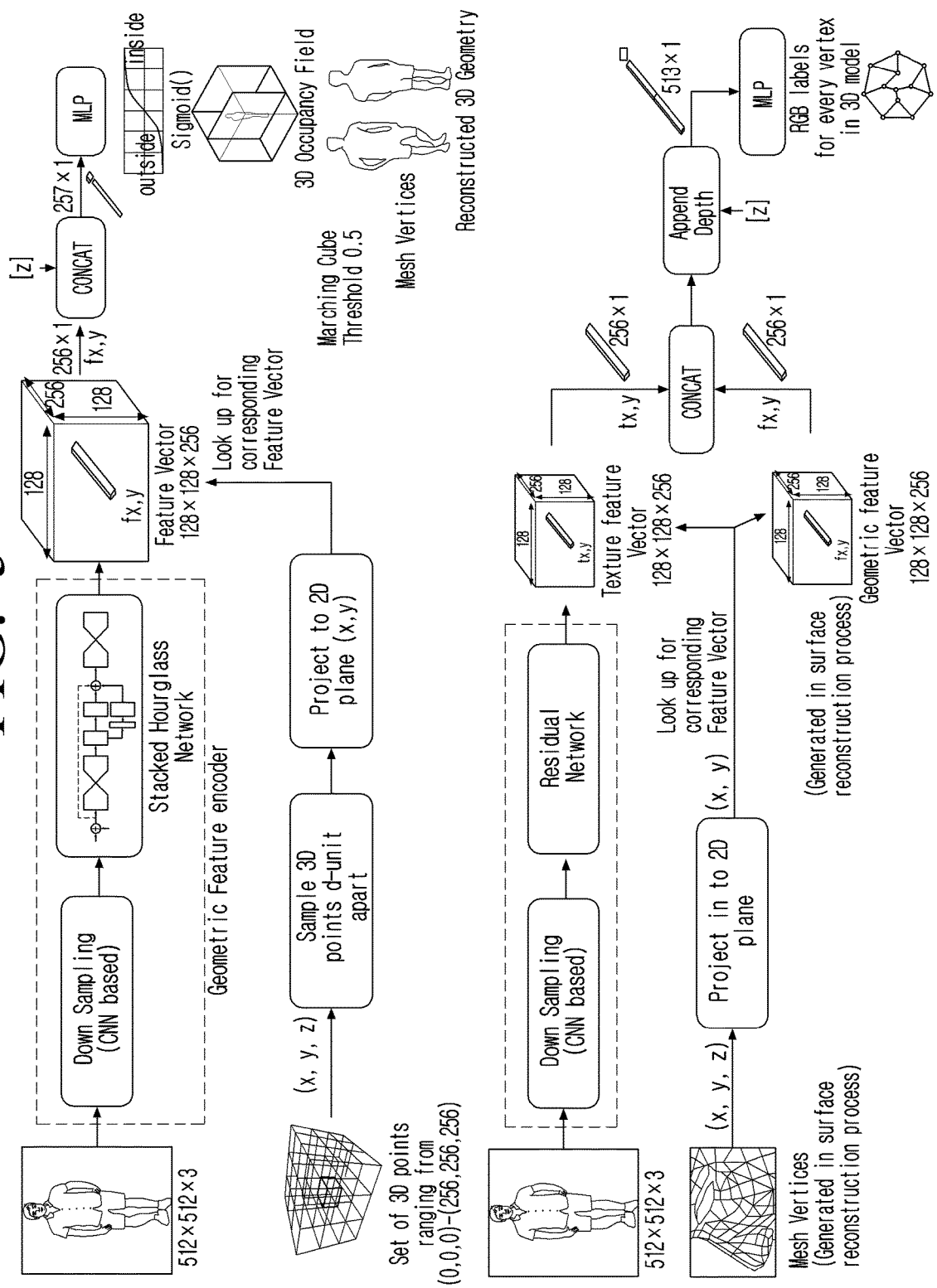
FIG. 5 is an example diagram depicting generation and enhancement of the 3D model according to embodiments of the disclosure.

FIG. 5 is an example diagram depicting the generation and enhancement of the 3D model according to embodiments of the disclosure. The embodiments enable the electronic device 100 to generate the 3D model by enhancing the geometry prediction and texture mapping to the 3D human mesh using the guided ROI masking. The feature vectors are calculated using the input image and the first and second neural networks. Then, for a 3D grid of resolution 256×256×256, a score is calculated for all the elements in the grid in a hierarchical manner. In a first step, the scores are calculated for elements which are x units apart in the grid. In a second step, the values are interpolated for elements, which lie between the elements whose scores are already calculated and are similar. The first and second steps are repeated untill x !=1 and in each iteration value of x is divided by 2. After the scores are calculated for all the elements in the grid, the 3D model is finally generated using these scores.

The electronic device 100 receives an input 2D image of the object or the human avatar. The electronic device 100 adopts the first neural network 202a to regress the geometrical shape coordinates in the 3D occupancy field from the multi-level RGB features learned from the 3D ground truth human model. The electronic device 100 enhances the geometry or shape learning using the second loss or texture guided loss convergence, where the texture guided loss convergence may be minimized by propagating the ensemble loss (i.e., the ensemble of geometrical shape coordinates or geometry and texture prediction error compared with respect to the ground truth 3D human model). The electronic device 100 bootstraps the sampling points from the ground truth 3D human model separately for both the shape and texture and aggregates the ensemble losses during each forward and backward passes over the dithering region of the ROI boundary. The electronic device 100 also boosts the third neural network 202c used to predict the geometrical shape coordinates and the texture parameters of the occluded portions by identifying the misclassified surface points in the previous epochs and providing more weightage to the identified misclassified surface points to train or update the third neural network 202c in subsequent epochs. The electronic device 100 also uses the generative adversarial networks especially conditional image to image translation for enhancing the geometrical shape coordinates and the texture parameters of the unseen or occluded portions.

The electronic device 100 uses the normal surface points (x, y, z) to identify the points localization with respect to the camera and wrap corresponding color, lighting information, view correction, and shaded for realistic rendering. The electronic device 100 also enhances learning of the geometrical shape coordinates depending on the textures predicted at multi-levels for the unseen views and boosting a gradient flow with texture to shape skip connections.

Figure 6:
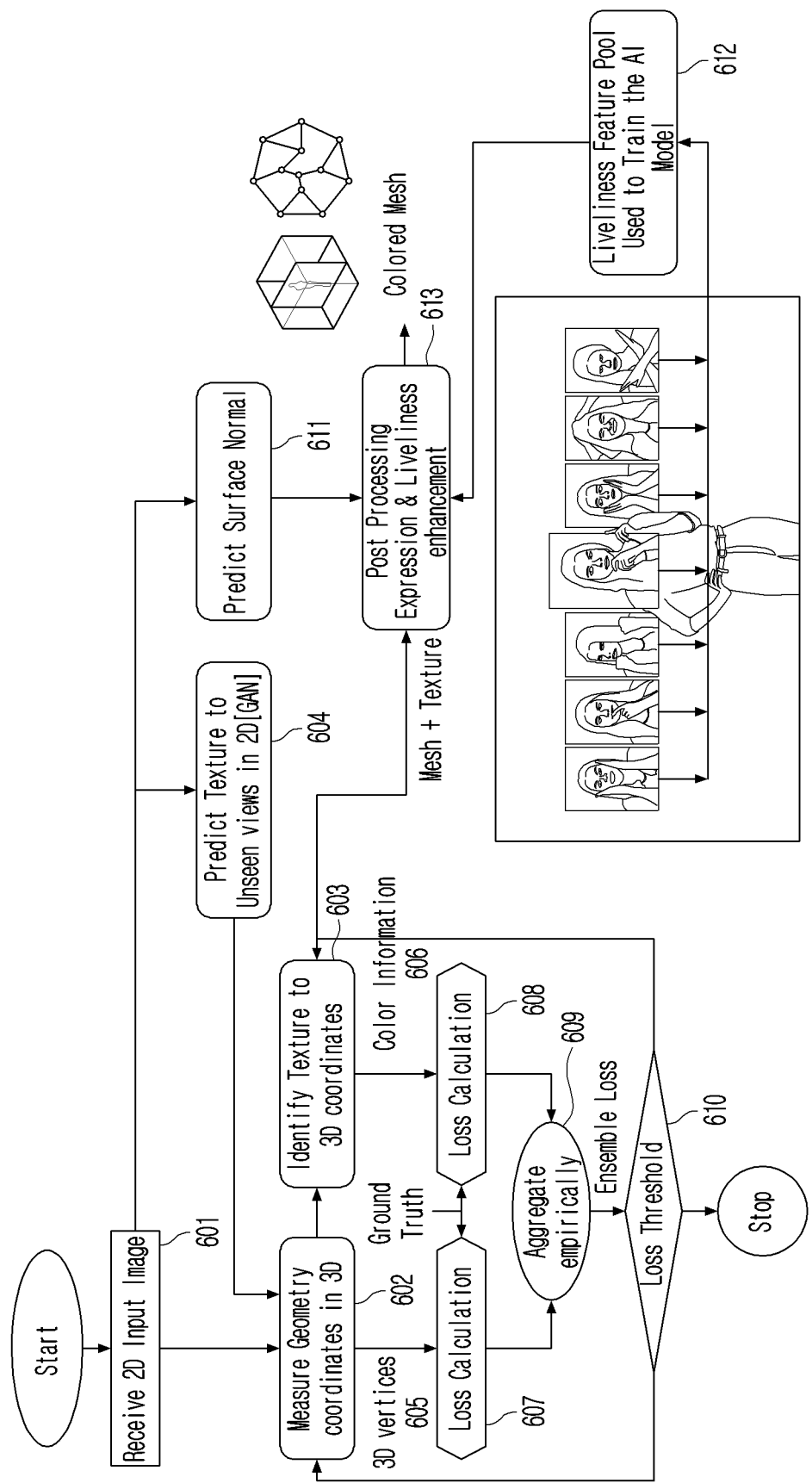
FIG. 6 is an example flow diagram depicting a method for generation of the 3D model and adding liveliness to parts of the object in the 3D model according to embodiments of the disclosure.

FIG. 6 is an example flow diagram depicting a method for generation of the 3D model and adding the liveliness to the parts of the object in the 3D model, according to embodiments of the disclosure.

At step 601, the electronic device 100 receives the 2D input image of the image. At step 602, the electronic device 100 measures the geometrical shape coordinates in the 3D from the 2D input image using the first neural network 202a (i.e., from the visible view). At step 603, the electronic device 100 identifies the texture parameters in the 3D coordinates from the input image (i.e., from the visible view). At step 604, the electronic device 100 predicts the geometrical shape coordinates and the texture parameters of the occluded portions/unseen views in the 2D by using the third neural network 202c.

At step 605, the electronic device 100 extracts the 3D vertices by mapping the geometrical coordinates determined in the 3D to the geometrical shape coordinates of the occluded portions determined in the 2D. At step 606, the electronic device 100 extracts the color information by mapping the texture parameters determined in the 3D to the texture parameters of the occluded portions determined in the 2D.

At step 607, the electronic device 100 computes the first loss or geometry loss based on the 3D vertices. At step 608, the electronic device 100 computes the second loss based on the color information. At step 609, the electronic device 100 computes the ensemble loss based on the first loss and the second loss. The electronic device 100 forms the colored mesh based on the computed ensemble loss, the extracted 3D vertices, and the color information. The electronic device 100 processes the colored mesh to generate the 3D model of the object.

At step 610, the electronic device 100 compares the ensemble loss with a loss threshold. The electronic device 100 repeats the steps 602-610 based on the comparison of the ensemble loss with the loss threshold.

To add the liveliness to the 3D model, at step 611, the electronic device 100 preforms the surface normal based view prediction to correct the one or more parameters of the 3D model. The one or more parameters may include at least one of lighting conditions, shades, and so on.

At step 612, the electronic device 100 creates the feature pool using the fifth neural network 202e which may be an AI based 3D face model. The feature pool includes the expressions and the liveliness effects.

At step 613, the electronic device 100 adds the liveliness to the parts of the object (for example, a face region, a nose, eyes, chin, hair, or the like) based on the surface normal based view prediction, and the created feature pool.

FIG. 7 depicts example 3D models of a human body generated and enhanced according to embodiments of the disclosure.

FIG. 8 depicts an example 3D model with the added liveliness to a face of the human.

Figure 9:
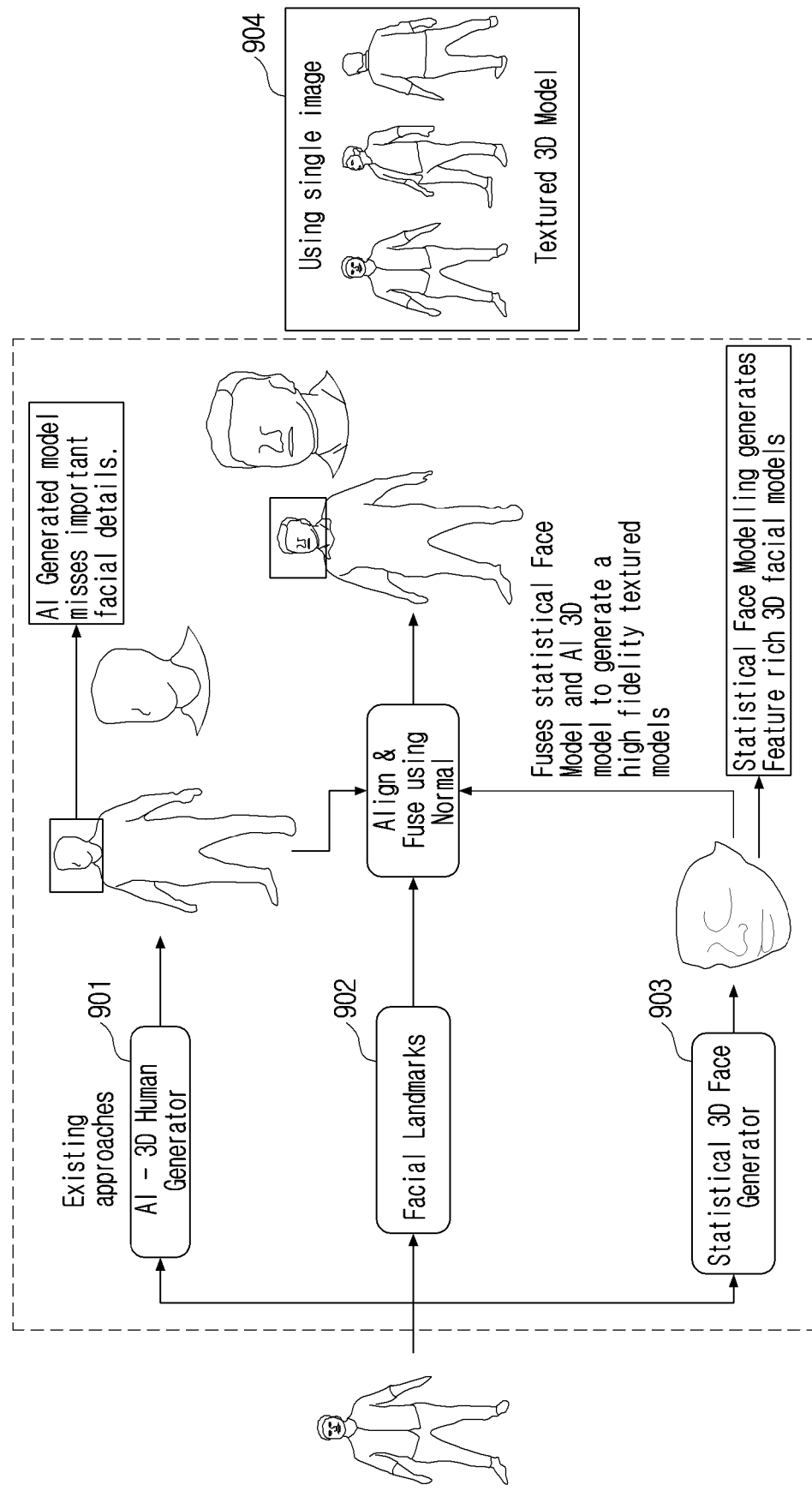
FIG. 9 is an example diagram depicting a comparison of generation of a fully texture 3D model using a single two dimensional (2D) image with existing 3D model generation methods according to embodiments of the disclosure.

FIG. 9 is an example diagram depicting a comparison of generation of the fully texture 3D model using the single 2D image with existing 3D model generation methods, according to embodiments of the disclosure.

In existing methods, the 3D model of the human body may be generated using an AI 3D human generator 901. However, the AI generated 3D model misses important facial details and also finer details in the shape. Further, the existing methods may use the AI 3D human generator 901, facial landmarks 902, and a statistical 3D face generator 903 to generate the high fidelity texture modes. In contrast, the embodiments of the disclosure enable the electronic device 100 to generate the fully textured 3D model 904 of the human body using the single image and without using the facial landmarks, and without generating the 3D face.

FIG. 10 is an example diagram depicting applications 1001, 1002, 1003, 1004 in which the method of generating the 3D models from the single image may be deployed, according to embodiments of the disclosure. The above described methods and systems for generating the 3D models may be deployed in the applications such as:

video based applications, where a motion of a source video clip may be extracted and applied on the 3D model of the human avatar;

AR emojis based applications, where a face of famous GIFs may be replaced with the human face, and an emojis selected by the user may be applied on the 3D model of the human face;

VR based applications, where the 3D model of the human avatar may be generated to assist queries of the user virtually; and gaming applications, where the 3D model of game avatars of real people/celebrities may be generated.

FIG. 11 is a flow chart 1100 depicting a method for generating the 3D model of the object according to embodiments of the disclosure.

At step 1102, the method includes receiving, by the electronic device 100, the 2D view of at least one object as the input. At step 1104, the method includes measuring, by the electronic device 100, the geometrical shape coordinates of the at least one object from the input. At step 1106, the method includes identifying, by the electronic device 100, the texture parameters of the at least one object from the input.

At step 1108, the method includes predicting, by the electronic device 100, the geometrical shape coordinates and the texture parameters of the occluded portions of the at least one object in the 2D view by processing the measured geometrical shape coordinates, the identified texture parameters of the at least one object, and the occluded portions of the at least one object using the third neural network 202c.

At step 1110, the method includes generating, by the electronic device 100, the 3D model of the at least one object by mapping the measured geometrical shape coordinates and the identified texture parameters to the predicted geometrical shape coordinates and the texture parameters of the occluded portions of the at least one object. The various actions in method 1100 may be performed in the order presented, in a different order or simultaneously. Further, in some embodiments, some actions listed in FIG. 11 may be omitted.

The embodiments of the disclosure relate to an enhanced 2D image to 3D shape and texture prediction method. The method includes enhancing learning for shape prediction by using the localized texture information of the human object. The method further includes aggregating the losses using an empirical correlation model between the shape and the texture over resampling. The method further includes optimizing the geometry loss in an iterative process by using the predicted texture for unseen or unavailable views. The method further includes by using surface normal based view prediction to correct lighting condition, shades, and so on, specifically in a face region.

The embodiments of the disclosure enhance the geometry or shape learning by using a texture guided loss convergence, where the loss may be minimized by back propagating the ensemble of geometry and texture prediction error compared with respect to ground truth human 3D models.

The embodiments of the disclosure bootstrap sampling points from the ground truth 3D model separately for both the shape and texture and aggregate losses during iterative passes over dithering region of ROI boundary.

The embodiments of the disclosure generate adversarial networks especially conditional image to image translation for enhancing shape and texture prediction for the unseen or occluded portions.

The embodiments of the disclosure perform the surface normal based view prediction to correct lighting condition, shades, and so on, specifically in the face region (for example, eye, nose, chin, hair, mouth, lips, cheeks, ears, and so on).

The embodiments of the disclosure reconstruct a single image based full body 3D human model with scope for custom AR fittings for differentiated content creation.

The embodiments of the disclosure utilize a concept of boosting technique from a machine learning (ML) module to train deep neural networks.

The embodiments of the disclosure identify weightage to misclassified surface points from the previous epochs and provide more weightage to the misclassified surface points, while training the deep neural network, which makes the deep neural network a strong learner. Embodiments herein preserve the finer details in the shape using a surface normal and enhance the texture information using the generative adversarial techniques for the unseen views.

For training the deep neural network for shape and texture, the embodiments sample surface points XYZ and texture RGB values to learn to predict a surface point cloud and their corresponding color information. And in each epoch, embodiments herein identify points for which the deep neural network has performed bad and boost the deep neural network model by providing more importance to such identified points in subsequent epochs.

The embodiments of the disclosure use a CGAN to predict occluded texture region and warp both visible and occluded color information onto the 3D human avatar.

The embodiments of the disclosure evaluate reconstruction accuracy/accuracy of generation of the 3D model of quantitatively using two metrics. Embodiments herein measure a Chamfer distance from the vertices on a reconstructed surface to the ground truth. Embodiments herein determines that using the CGAN based surface normal estimation and network ensemble technique provides a better understanding of the underlying surface compared to Multi-Level Pixel-Aligned Implicit Function (PIFuHD). Embodiments herein provide better occluded texture prediction using the CGAN compared to PIFu and a baseline model.

The embodiments of the disclosure can be implemented through at least one software program running on at least one hardware device and performing network management functions to control the elements. The elements shown in FIGS. 1 and 2 can be at least one of a hardware device, or a combination of hardware device and software module.

The embodiments of the disclosure describe methods and systems for generating three dimensional (3D) models of objects. Therefore, it is understood that the scope of the protection is extended to such a program and in addition to a computer readable means having a message therein, such as a computer-readable storage medium containing instructions or program codes for implementation of one or more steps of the method, when the program runs on a server or mobile device or any suitable programmable device. The method is implemented in an embodiment through or together with a software program written in, e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be, e.g. hardware means like, e.g. an ASIC, or a combination of hardware and software means, e.g. an ASIC and an FPGA, or at least one microprocessor and at least one memory with software modules located therein. The method embodiments of the disclosure can be implemented partly in hardware and partly in software. Alternatively, the embodiments may be implemented on different hardware devices, e.g. using a plurality of CPUs.

In the disclosure, a computer-readable recording medium may be provided in the form of a non-transitory storage medium. Here, the term 'non-transitory storage medium' may mean that the storage medium is a tangible device and does not include signals (e.g., electromagnetic waves), and may mean that data may be permanently or temporarily stored in the storage medium. For example, the 'non-transitory storage medium' may include a buffer in which data is temporarily stored.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for generating a three-dimensional (3D) model of an object, the method comprising:

receiving, by an electronic device, a two-dimensional (2D) view of at least one object as an input;

measuring, by the electronic device, geometrical shape coordinates of the at least one object from the input;

identifying, by the electronic device, texture parameters of the at least one object from the input;

predicting, by the electronic device, geometrical shape coordinates and texture parameters of occluded portions of the at least one object in the 2D view by processing the measured geometrical shape coordinates of the at least one object, the identified texture parameters of the at least one object, and the occluded portions of the at least one object; and generating, by the electronic device, a 3D model of the at least one object by mapping the measured geometrical shape coordinates and the identified texture parameters to the predicted geometrical shape coordinates and the predicted texture parameters of the occluded portions of the at least one object, wherein the predicting of the geometrical shape coordinates and the texture parameters of the occluded portions of the at least one object in the 2D view comprises:

processing the measured geometrical shape coordinates of the at least one object, the identified texture parameters of the at least one object, and the occluded portions of the at least one object by using a first module of a third neural network to predict normal maps for the at least one object;

processing the measured geometrical shape coordinates of the at least one object, the identified texture parameters of the at least one object, and the occluded portions of the at least one object by using a second module of the third neural network to predict occluded portions normal maps for the at least one object from the predicted normal maps; and processing the measured geometrical shape coordinates of the at least one object, the identified texture parameters of the at least one object, and the occluded portions of the at least one object by using a third module of the third neural network to predict a texture map of the occluded portions of the at least one object using a training input, wherein the normal maps and the occluded portions normal maps indicate the geometrical shape coordinates of the occluded potions of the at least one object at multiple scales, and the texture map indicates the texture parameters of the occluded potions of the at least one object.

2. The method of claim 1, wherein the first, second and third modules of the third neural network include separate convolutional neural networks or generative adversarial networks, wherein the first module is trained to predict the normal maps from the input, wherein the second module is trained to predict the occluded portions normal maps from the predicted normal maps, and wherein the third module is trained to predict the texture parameters of the occluded portions using the input.

3. The method of claim 1, wherein the third neural network is trained in a plurality of epochs, and wherein the training of the third neural network at each epoch of the plurality of epochs comprises:

sampling surface points and texture RGB values from a training input, wherein the training input includes the batches of 2D images;

identifying misclassified surface points from previous epochs and providing weightage to the misclassified surface points;

training the third neural network based on the identified misclassified surface points to predict the geometrical shape coordinates and the texture parameters of the occluded portions of each object present in the training input;

deriving a cost function to calculate an accuracy of the third neural network in predicting the geometrical shape coordinates and the texture parameters of the occluded portions of each object present in the training input, wherein the cost function is a weighted sum of losses computed with respect to the geometrical shape coordinates and the texture parameters; and back propagating the cost function to the third neural network to train the third neural network iteratively.

4. The method of claim 1, wherein a fourth neural network is used to detect the occluded portions of the at least one object, and wherein the fourth neural network includes a Conditional Generative Adversarial Network (CGAN).

5. An electronic device comprising:
a processor; and
a memory storing instructions executable by the processor, wherein the processor is coupled to the memory and configured to:

receive a two-dimensional (2D) view of at least one object as an input;

measure geometrical shape coordinates of the at least one object from the input;

identify texture parameters of the at least one object from the input;

predict geometrical shape coordinates and texture parameters of occluded portions of the at least one object in the 2D view by processing the measured geometrical shape coordinates of the at least one object, the identified texture parameters of the at least one object, and the occluded portions of the at least one object; and generate a three-dimensional (3D) model of the at least one object by mapping the measured geometrical shape coordinates and the identified texture parameters to the predicted geometrical shape coordinates and the predicted texture parameters of the occluded portions of the at least one object, wherein the processor is further configured to:

process the measured geometrical shape coordinates of the at least one object, the identified texture parameters of the at least one object, and the occluded portions of the at least one object by using a first module of a third neural network to predict normal maps for the at least one object;

process the measured geometrical shape coordinates of the at least one object, the identified texture parameters of the at least one object, and the occluded portions of the at least one object by using a second module of the third neural network to predict occluded portions normal maps for the at least one object from the predicted normal maps; and process the measured geometrical shape coordinates of the at least one object, the identified texture parameters of the at least one object, and the occluded portions of the at least one object by using a third module of the third neural network to predict a texture map of the occluded portions of the at least one object using a training input, wherein the normal maps and the occluded portions normal maps indicate the geometrical shape coordinates of the occluded potions of the at least one object at multiple scales, and the texture map indicates the texture parameters of the occluded potions of the at least one object.

6. An electronic device comprising:
a processor; and
a memory storing instructions executable by the processor, wherein the processor is coupled to the memory and configured to:

receive a two-dimensional (2D) view of at least one object as an input;

measure geometrical shape coordinates of the at least one object from the input;

identify texture parameters of the at least one object from the input;

predict geometrical shape coordinates and texture parameters of occluded portions of the at least one object in the 2D view by processing the measured geometrical shape coordinates of the at least one object, the identified texture parameters of the at least one object, and the occluded portions of the at least one object; and generate a three-dimensional (3D) model of the at least one object by mapping the measured geometrical shape coordinates and the identified texture parameters to the predicted geometrical shape coordinates and the predicted texture parameters of the occluded portions of the at least one object, wherein the processor is further configured to:
obtain 3D vertices by mapping the measured geometrical shape coordinates of the at least one object to the predicted geometrical shape coordinates of the occluded portions of the at least one object,
obtain color information by mapping the identified texture parameters of the at least one object to the predicted texture parameters of the occluded portions of the at least one object, and
generate the 3D model of the at least one object based on the 3D vertices and the color information.

7. The electronic device of claim 6, wherein the processor is further configured to:
compare the generated 3D model with at least one pre-learned ground truth 3D model; and
enhance the generated 3D model of the at least one object based on the comparison.

8. The electronic device of claim 6, wherein the processor is further configured to:
train a first neural network by passing batches of 2D images through a series of convolutional encoders and decoders of the first neural network, wherein the first neural network is a deep convolutional network; and
use the trained first neural network to measure the geometrical shape coordinates of the at least one object from the input.

9. The electronic device of claim 6, wherein the processor is further configured to:
train a second neural network by passing batches of 2D images through a series of deep Residual neural networks of the second neural network; and
use the trained second neural network to identity the texture parameters of the at least one object.

10. The electronic device of claim 6, wherein the processor is further configured to:
compute a first loss based on the 3D vertices obtained by mapping the measured geometrical shape coordinates of the at least one object to the predicted geometrical shape coordinates of the occluded portions of the at least one object,
compute a second loss based on the color information obtained by mapping the identified texture parameters of the at least one object to the predicted texture parameters of the occluded portions of the at least one object,
compute an ensemble loss by aggregating the computed first loss and the computed second loss by using an empirical correlation model between shape and texture over resampling,
form a colored mesh based on the computed ensemble loss, the extracted 3D vertices and the color information, and
process the colored mesh to generate the 3D model of the at least one object.

11. A method for generating a three-dimensional (3D) model of an object, the method comprising:
receiving, by an electronic device, a two-dimensional (2D) view of at least one object as an input;
measuring, by the electronic device, geometrical shape coordinates of the at least one object from the input;
identifying, by the electronic device, texture parameters of the at least one object from the input;
predicting, by the electronic device, geometrical shape coordinates and texture parameters of occluded portions of the at least one object in the 2D view by processing the measured geometrical shape coordinates of the at least one object, the identified texture parameters of the at least one object, and the occluded portions of the at least one object; and
generating, by the electronic device, a 3D model of the at least one object by mapping the measured geometrical shape coordinates and the identified texture parameters to the predicted geometrical shape coordinates and the predicted texture parameters of the occluded portions of the at least one object, wherein the generating of the 3D model of the at least one object comprises:
obtaining 3D vertices by mapping the measured geometrical shape coordinates of the at least one object to the predicted geometrical shape coordinates of the occluded portions of the at least one object,
obtaining color information by mapping the identified texture parameters of the at least one object to the predicted texture parameters of the occluded portions of the at least one object, and
generating the 3D model of the at least one object based on the 3D vertices and the color information.

12. The method of claim 11, further comprising:
comparing, by the electronic device, the generated 3D model with at least one pre-learned ground truth 3D model; and
enhancing, by the electronic device, the generated 3D model of the at least one object based on the comparison.

13. The method of claim 11, wherein the at least one object is at least one human body.

14. The method of claim 11, wherein the receiving of the 2D view of the at least one object comprises:
capturing the 2D view of the at least one object with a presence of a background and invariant to at least one of a pose of capture, an object to camera localization, and environmental lighting condition.

15. The method of claim 11, wherein the measuring of the geometrical shape coordinates of the at least one object from the input comprises:
training a first neural network by passing batches of 2D images through a series of convolutional encoders and decoders of the first neural network, wherein the first neural network is a deep convolutional network; and
using the trained first neural network to measure the geometrical shape coordinates of the at least one object from the input.

16. The method of claim 11, wherein the identifying of the texture parameters of the at least one object from the input comprises:
training a second neural network by passing batches of 2D images through a series of deep Residual neural networks of the second neural network; and
using the trained second neural network to identity the texture parameters of the at least one object.

17. The method of claim 11, wherein the generating of the 3D model of the at least one object by mapping the measured geometrical shape coordinates and the identified texture parameters to the predicted geometrical shape coordinates and the predicted texture parameters further comprises:
computing a first loss based on the 3D vertices obtained by mapping the measured geometrical shape coordinates of the at least one object to the predicted geometrical shape coordinates of the occluded portions of the at least one object;

computing a second loss based on the color information-obtained by mapping the identified texture parameters of the at least one object to the predicted texture parameters of the occluded portions of the at least one object;

computing an ensemble loss by aggregating the computed first loss and the computed second loss by using an empirical correlation model between shape and texture over resampling;

forming a colored mesh based on the computed ensemble loss, the extracted 3D vertices and the color information; and processing the colored mesh to generate the 3D model of the at least one object.

18. The method of claim 17, wherein the 3D model of the at least one object includes scopes for custom Augmented Reality (AR) fittings for differentiated content creation.

19. The method of claim 17, further comprising:

comparing, by the electronic device, the generated 3D model with at least one pre-learned ground truth 3D model; and enhancing, by the electronic device, the generated 3D model of the at least one object based on the comparison, wherein the enhancing of the generated 3D model of the at least one object comprises:

enhancing the geometrical shape coordinates of the 3D model of the at least one object by using a convergence of the first loss and the second loss.

20. The method of claim 19, further comprising:

minimizing the convergence of the first loss and the second loss by comparing ensemble losses computed using sampling points bootstrapped from the at least one ground truth 3D model separately for the geometrical shape coordinates and the texture parameters of the 3D model;

aggregating the ensemble losses for all the sampling points during iterative passes over a dithering region of Region of Interest (ROI) boundary of the 3D model; and back propagating the aggregated ensemble losses to a first neural network to train the first neural network iteratively.

21. A non-transitory computer-readable recording medium having recorded thereon a program for executing the method of claim 11.

* * * * *